United States Patent [19]

Hibbs, Jr. et al.

[11] 3,852,049

[45] Dec. 3, 1974

[54] VITREOUS-BONDED CUBIC BORON NITRIDE ABRASIVE GRINDING SYSTEM

[75] Inventors: Louis E. Hibbs, Jr., Schenectady; Kenneth A. Darrow, Sprakers; William R. Reed, Jr., Schenectady, all of N.Y.

[73] Assignee: General Electric Company, Schenectady, N.Y.

[22] Filed: Apr. 2, 1973

[21] Appl. No.: 346,920

[52] U.S. Cl. .................................. 51/308, 51/309
[51] Int. Cl. .......................................... C04b 31/16
[58] Field of Search .............. 51/295, 308, 309, 298

[56] References Cited
UNITED STATES PATENTS

| | | |
|---|---|---|
| 3,576,610 | 4/1971 | Mathewson .......................... 51/308 |
| 3,645,706 | 2/1972 | Bovenkerk .......................... 51/298 |
| 3,650,714 | 3/1972 | Farkas ................................. 51/308 |
| 3,664,819 | 5/1972 | Sioui et al. .......................... 51/298 |
| 3,779,727 | 12/1973 | Siqui et al. .......................... 51/298 |

*Primary Examiner*—Donald J. Arnold
*Attorney, Agent, or Firm*—Leo I. MaLossi; Joseph T. Cohen; Jerome C. Squillaro

[57] ABSTRACT

A vitreous-bonded cubic boron nitride abrasive grinding system for wet grinding is described utilizing borosilicate glass in combination with a metal filler. The metal is selected from the class consisting of molybdenum, tungsten and alloys thereof.

3 Claims, No Drawings

3,852,049

VITREOUS-BONDED CUBIC BORON NITRIDE ABRASIVE GRINDING SYSTEM

BACKGROUND OF THE INVENTION

Individual cubic boron nitride grains coated with a thin layer of borosilicate are described in U.S. Pat. No. 3,576,610 — Mathewson.

The art is consistently in need of improved grinding capability for machining aerospace alloys. This invention relates to an improved grinding system directed to this end.

SUMMARY OF THE INVENTION

The instant invention is directed to a vitreous-bonded cubic boron nitride abrasive grinding system for wet grinding embodying borosilicate glass in combination with a metal filler. The metal is selected from the class consisting of molybdenum, tungsten and alloys thereof.

DESCRIPTION OF THE PREFERRED EMBODIMENT

On the premise that filler materials could be found that would have a beneficial effect on the CBN grit/borosilicate glass matrix bond, investigations were conducted to isolate any such fillers. It was anticipated that lead oxide borosilicate glass being used might not be stable when fired in a non-oxidizing atmosphere and, for that reason, the first materials investigated were refractory filler materials.

The first filler material employed was alumina and the composition of this wheel (No. 1) is shown in Table IV below. The results of grinding with wheel No. 1 are shown in Table V. The performance was so poor that grinding ratios could not be obtained and microscopic examination revealed massive transfer of workpiece material to the wheel. The indication was that a chemical reaction had occurred between the metal of the workpiece and either the glass or the alumina filler.

Next, wheels were constructed using only the borosilicate glass and CBN grains; these wheels are indicated as Nos. 2 and 3 in Tables IV and V. When wheel No. 2 was fired at 950°C, the CBN became thoroughly wetted by the glass, however, the rim slumped when fired at 950°C. Thereafter, the contents of wheel No. 2 was carefully crushed into a coarse powder including agglomerates of several of the original CBN crystals. Polymethylmethacrylate was added as a binder and the material was remolded as wheel No. 3. The new binder enabled firing at a lower temperature (775°C 1/2 hour), the bulk of the CBN grit having already been glass-coated. Testing of wheel No. 3 (Table V) on Inconel 718 clearly indicated that the alumina filler (not the glass) used in wheel No. 1 had been the major cause of loading of the wheel with metal from the workpiece.

The experiments with wheels Nos. 1 and 3 established that a suitable filler was, indeed, required, but the filler would have to very significantly reduce wheel loading. Because of the imposed restriction of firing in an oxidizing atmosphere to preserve the properties of the borosilicate glass, a number of refractory compounds were given a preliminary evaluation as shown in Table I. Each cylindrical pill sample was pressed cold (pressure of about 5000 psi) and then transferred to the furnace for firing. The cylindrical pill specimens were examined for dimensional changes occurring during firing and evidence of chemical reactions (such as gas holes, porosity, friability, etc.). Each sample was broken and the fractured surfaces examined to note any differences between the interior and the exterior surfaces.

TABLE I

CYLINDRICAL PILL SPECIMENS FIRED IN AIR (All specimens - 67 v/o filler, 33 v/o SG-7* glass, fired one-half hour at 950°C)

| Filler Material | Remarks |
| --- | --- |
| $W_2B_5$ | some evidence of gas evolution; surface bubbles; very slight volume increase; |
| $ZrB_2$ | essentially the same as the $W_2B_5$ sample; |
| $WSi_2$ | large increase in volume; very friable; not good; |
| TiN | Same as $WSi_2$ |
| TiC | do. |
| WC-TiC (50—50 by wt.) | do. |
| $B_4C$ | very small volume increase; some evidence of gas evolution; formation of additional phase as white crystals on surface; questionable usefulness. |

* SG-7 glass - lead oxide borosilicate glass manufactured by Owen-Illinois, Toledo, Ohio.

As may be seen from Table I the only refractory compounds that yielded reasonably dense bodies were zirconium diboride and tungsten pentaboride. Thereafter, wheel No. 4 was made using zirconium diboride as the filler. All experimental grinding wheels were pressed hot (160°C) using polymethylmethacrylate as the binder for green strength. Except where otherwise noted, the pressure employed was 5000 psi, the pressure being maintained until the mold had cooled below 50°C. In each instance an abrasive rim was prepared (1 inch O.D. × ¾ inch I.D. × ¼ inch wide) and mounted on an aluminum alloy hub, using epoxy resin cement. All grinding tests were run under carefully controlled standardized conditions.

1. Standard Surface Grinding Test Conditions
Wheel Speed — 5,500 surface feet/minute
Table Traverse Speed — 18 feet/minute
Crossfeed — 0.050 inch/pass
Downfeed — Variable (see Table V for values used)

Grinding Wheel — 1 inch dia., ¼ inch wide (nominal)
Lubrication — Mist, applied with high pressure air aspirator (80–100 lbs.)

2. Lubricants and Coolants
Rust Lick — A chemical grinding concentrate, diluted to 1 percent with water;
Vantrol — 5495G — A heavy duty sulfurized and chlorinated cutting oil, manufactured by Van Straaten Chemical Company, Chicago, Ill.
Sun Grind 600X — A grinding oil specifically formulated for severe operations such as thread grinding; less viscous than Vantrol 5495G; manufactured by Sun Oil Company, Philadelphia, Pa.
No. 4204 — A napthenic mineral oil containing 4% iodine and bromine.

3. Workpiece Materials
M2 High Speed Tool Steel ($R_c$ 60–61)
Inconel 718 ($R_c$ 42–44) Ni base high temperature, high strength alloy; solution treated and aged.

A two-step process was used to true and open the surface of each grinding wheel before it was first tested. Both steps were performed dry.

Truing was accomplished by running the wheel against a resin-bonded bar containing —400 mesh diamond abrasive. This bar was clamped in a fixture mounted on the grinder table. The wheel speed was 18,000 rpm; the table speed was 18 fpm; and the downfeed was 0.0001 inch. The crossfeed was 0.050 inch per pass continued until the wheel was true. The crossfeed was then reduced to 0.010 inch and an additional 0.0001 inch was removed from the wheel.

After the truing operation, the wheel surface was too smooth for grinding. Therefore, the diamond tool was replaced with a Norton No. 37C 220 kv silicon carbide dressing stick, and the previous operation was repeated. The wheel speed and table speed were the same as before and the crossfeed was kept at 0.050 inch. The downfeed, which was started at a low value, was increased every few passes to a final value of 0.003 inch. These conditions were maintained until 0.200 inch had been ground from the silicon carbide stick, at which point the wheel bond had been eroded back sufficiently to expose the abrasive grit and permit grinding on metal workpieces.

Additional grinding on tool steel at low downfeeds was usually necessary to open the wheel surface sufficiently to make a grinding ratio test.

The testing of wheel No. 4 was disappointing, because although there was no indication of transfer of metal to the wheel, the wheel was so soft that loading would not have been expected. Reexamination of the tungsten boride and zirconium boride pill specimens (Table I) showed a difference in appearance between the centers and the regions near and at the surface. It was then decided that oxidation during firing was causing undesirable changes in the filler and tests were undertaken to see what affect the use of a non-oxidizing atmosphere would have on the properties of the glass matrix.

Table II shows the results of a re-evaluation of the refractory compounds shown in Table I with the firing now being conducted in a non-oxidizing atmosphere.

TABLE II

CYLINDRICAL PILL SPECIMENS FIRED IN NITROGEN (¼ HOUR AT 950°C)

| Filler Material | Volume Percent Filler | Remarks |
|---|---|---|
| ZrB$_2$ | 67 | no significant volume change; harder than equivalent sample fired in air; |
| ZrB$_2$ | 50 | slight volume decrease; calculated density — 70% of theoretical; |
| ZrB$_2$ | 33 | slight volume decrease; fractured specimen was hard, tough; density - 87% of theoretical value; |
| W$_2$B$_5$ | 33 | slight decrease in volume; quite hard; no evidence of significant chemical reactions; |
| SiC | 33 | evidence of reaction; porosity; metallic Cu from reduction of glass present at surface; |
| B$_4$C | 33 | friable; evidence of crystals of additionally formed phases; |
| TiC | | very friable; |
| WC–TiC (50—50 by wt) | 33 | do. |
| TiN | 33 | large volume increase; apparent great evolution of gaseous products; very porous product; not usable. |

Again, only the zirconium diboride and tungsten pentaboride samples showed promise. As the glass content was increased, the toughness increased and the degree of porosity decreased. Fortunately, it was found that the glass properties were not significantly affected by the change in the firing regimen.

Wheels containing tungsten pentaboride (No. 8) and zirconium diboride (No. 9) as the filler materials were made and fired in a nitrogen furnace atmosphere. The nominal composition of these wheels was 25 v/o CBN, 15 v/o filler, 30 v/o lead oxide borosilicate glass and 30 v/o voids. The final compositions calculated from the final dimensions of the rims are given in Table IV. Although the results of grinding tests (Table V) showed that these wheels were superior to those obtained with vitreous bonds fired in air, the performance was still not good enough.

Without the previously imposed constraint of firing in an oxidizing atmosphere, it now became feasible to investigate the use of metal as a filler for the vitreous-bonded CBN system. This change did offer the possibility of a system in which the thermal expansion characteristics of all the constituents could be essentially identical. The idea of using a metal filler did, however, run contrary to the prospect of further reducing workpiece-wheel interaction and the consequent metal transfer.

Molybdenum (325 mesh, U.S. Sieve) was chosen for the preparation of a series of pill specimens for preliminary evaluation as set forth in Table III. In each test the CBN grains were 120/140 mesh size (U.S. Sieve). It was determined that the useful glass-to-molybdenum ratios could vary from about 2:1 to 1:2.

Examination of a polished section of sample 3 (Table III) under high magnification (1,000X) shows the development of a thin layer at the glass/CBN interface, which is apparently different from either the glass or the CBN. This layer, the composition of which is unknown at present, may account for the tenacity of the bond. Lead oxide borosilicate glass employed in sample 4 of Table III is a crystallizing glass with the same thermal expansion as the SG-7 glass.

TABLE III

CYLINDRICAL PILL SPECIMENS CONTAINING MOLYBDENUM, METAL FILLER PLUS CBN

| Sample No. | Composition (volume percent) | | Porosity (v/o, calc.) | Remarks |
|---|---|---|---|---|
| 1 | 33 | SG-7 glass | — | no significant volume change; visual evidence of some reduction of copper from glass; not friable; tougher than any specimens made from refractory fillers; |
| | 67 | Mo | | |

TABLE III—Continued

CYLINDRICAL PILL SPECIMENS CONTAINING MOLYBDENUM, METAL FILLER PLUS CBN

| Sample No. | Composition (volume percent) | Porosity (v/o, calc.) | Remarks |
|---|---|---|---|
| 2 | 37.5 SG-7<br>37.5 Mo<br>25.0 CBN | 30 | good wetting of CBN by glass; fractured surface showed cleaved and broken grit, indicating improved bond; |
| 3 | 50.0 SB-7 glass<br>25.0 Mo<br>25.0 CBN | 30 | wetting of CBN by glass improved over previous specimen; surface was tough, not friable; |
| 4 | 50.0 CV 635 glass*<br>25.0 Mo<br>25.0 CBN | 30 | no significant volume change on firing; glass appeared to wet CBN; specimen was tough; broken and cleaved abrasive visible at fractured surface. |

* The CV 635 (Owens-Illinois) sample was fired by heating to 950°C, holding for 5 minutes, cooling to 700°C, holding for 1 hour, then cooling to room temperature.

The results of the tests on the pill specimens (Table III) were so promising that it was then decided to make grinding wheels containing molybdenum as the filler. The compositions of the test wheels and comparable grinding test results are set forth in Tables IV and V below. The nominal concentration of CBN abrasive in all wheels except Nos. 2 and 3 was 25 v/o. The compositions given are those calculated from the final dimensions of the completed rims.

TABLE IV

| Wheel No. | Abrasive | v/o | Filler | v/o | Glass | v/o | v/o porosity | Max. Firing Temp. °C | Furnace Atmosphere | Remarks |
|---|---|---|---|---|---|---|---|---|---|---|
| 1 | CBN | 17 | Alundum | 30.6 | SG-7 | 13.6 | 39.4 | 950 | Air | |
| 2 | CBN | 40 | — | — | SG-7 | 20 | 40 | 950 | Air | Rim sagged during firing. |
| 3 | CBN | 40 | — | — | SG-7 | 20 | 40 | 775 | Air | |
| 4 | CBN | 16.8 | $ZrB_2$ | 31.9 | SG-7 | 15.1 | 36.2 | 950 | Air | |
| 5 | CBN | 27.7 | Mo | 16.7 | SG-7 | 33.3 | 22.3 | 950 | $N_2$ | |
| 6 | CBN | 25.0 | Mo | 15.0 | SG-7 | 30.0 | 30.0 | 950 | $N_2$ | |
| 7 | CBN | 27.3 | $ZrB_2$ | 16.4 | SG-7 | 32.7 | 23.6 | 950 | $N_2$ | Rim accidentally broken during mounting on hub; not tested. |
| 8 | CBN | 27.5 | $W_2B_5$ | 16.5 | SG-7 | 33.0 | 23.0 | 950 | $N_2$ | |
| 9 | CBN | 27.4 | $ZrB_2$ | 16.4 | SG-7 | 32.9 | 23.3 | 950 | $N_2$ | |

TABLE V

| Wheel No. | Workpiece | Material Removal Rate 3 (in³/min) | Downfeed (in.) | Lubricant | Grinding Ratio | Remarks |
|---|---|---|---|---|---|---|
| 1 | M2 | 0.0081 | 0.0075 | Rust Lick | — | chatter, severe metal pickup; |
|   | In. 718 | 0.0054 | 0.0005 | Vantrol | — | chatter, metal pickup; |
| 3 | In. 718 | 0.0054 | 0.0005 | Vantrol | — | performed well for 50 min., then burst; possible machine malfunction; |
| 4 | M2 | 0.0081 | 0.0075 | Rust Lick | 0.4 | very soft wheel; no evidence of loading; |
| 9 | M2 | 0.0081 | 0.00075 | Vantrol | 409 | slight chatter; slight metal pickup; |
| 8 | M2 | 0.0054 | 0.0005 | Vantrol | 44 | soft wheel; no chatter; |

TABLE V – Continued

| Wheel No. | Workpiece | Material Removal Rate 3 (in³/min) | Downfeed (in.) | Lubricant | Grinding Ratio | Remarks |
|---|---|---|---|---|---|---|
| 5 | M2 | 0.0054 | 0.0005 | Vantrol | 1514 | no obvious chatter or wheel loading; |
|  | M2 | 0.081 | 0.00075 | Vantrol | 1520 |  |
|  | M2 | 0.0108 | 0.001 | Vantrol | 1990 |  |
|  | In. 718 | 0.0081 | 0.00075 | Vantrol | 511 |  |
| 6 | M2 | 0.0108 | 0.001 | Vantrol | 1940 | no obvious chatter, no metal pickup; |
|  | In. 718 | 0.0081 | 0.00075 | Vantrol | 1394 |  |
|  | In. 718 | 0.0084 | 0.00075 | Sun Grind | 173 | wheel chattered; |
|  | In. 718 | 0.0108 | 0.001 | Vantrol | 1192 | no chatter or wheel loading. |

Wheel No. 5 was tested first on M2 tool steel. There is no obvious explanation for the fact that the performance at 0.001-inch infeed was better than the performance at smaller feeds.

Wheel No. 6 performed even better than No. 5. Performance at 0.001-inch infeed was better than the performance of wheel No. 5 at 0.00075-inch infeed. The additional porosity, providing for better chip clearance and for more penetration of the lubricant into the cutting zone may account for the improved grinding ratios.

Examination of a polished section cut from the rim of wheel No. 5 (200X magnification) showed the porous character of the system, with abrasive particles firmly held in place. Fracture of the cutting points of the CBN crystals was evident. At higher magnification (1000X) extensively fractured abrasive particles were observed, which particles were still firmly bonded to the matrix and capable of doing more grinding work. There was no evidence of dull cutting edges and no obvious adhesion of metal from the workpiece to the abrasive. At very high magnification (20,000X) a portion of the fractured surface of a CBN crystal was examined and it was observed that the cleavage of CBN occurs along many well-defined planes permitting the abrasive grain to remain sharp and to grind efficiently as long as it is properly anchored in the wheel.

The role of the metal filler material in this vitreous system is not clearly understood. It is obvious, however, that the presence of the metal filler does serve to toughen and strengthen the borosilicates glass matrix. It has been demonstrated that reaction between the filler and workpiece causes excessive wheel loading and that a less reactive filler (zirconium boride vis-a-vis aluminum oxide) would significantly reduce metal transfer and improve grinding efficiency. According to the obvious reasoning the use of a metal filler, such as molybdenum or tungsten, would be expected to produce significant galling and welding, because of the greater reactivity of metals.

The unexpected behavior of the molybdenum filler can be hypothesized after the fact in that all the constituents making up the wheel are essentially matched with respect to thermal expansion (linear coefficients of thermal expansion of 35, 45 and 40 × $10^{-7}$ in. per in. per degree Centigrade for CBN, lead borosilicate glass, and molybdenum, respectively). The bond system is tougher, pullout of abrasive grains is reduced and the protrusion of the grit from the matrix is maintained so that less frictional heat is generated by the rubbing of non-abrasive constituents on the workpiece. In addition, the metal filler imparts much greater thermal conductivity to the wheel, which serves to further reduce the temperature at the wheel workpiece interface. As a result, the interface temperature may be reduced to the extent that molybdenum, which is a refractory metal, does not react significantly with the metal workpiece, if adequately lubricated.

Criteria for the selection of a borosilicate glass for use as the matrix in this system are:

1. The coefficient of thermal expansion should be almost identical to cubic boron nitride.
2. The glass, when molten, should exhibit a strong fluxing action, which cleans contaminants from the abrasive particle surface, permitting "wetting" to take place.
3. The glass should have sufficient thermal stability to permit firing, for short periods of time, at temperatures up to 950°C, much above the recommended temperature. At the higher temperatures the glass viscosity is greatly reduced, allowing the glass to penetrate minute crevices and cracks in the grit surface, resulting in a stronger bond.
4. The glass must tolerate firing in a neutral atmosphere, such as nitrogen, without significant impairment of properties.

The selection of the metal filler should be made in accordance with the following criteria:

1. The coefficient of thermal expansion should be close to that of the glass and the abrasive, in order to minimize deleterious stresses.
2. The filler should be chemically compatible with the glass over the entire temperature range used for firing the composite structure.
3. The filler must be wet by the glass.
4. The filler should reduce the brittleness of the glass, limit the propogation of cracks, and increase the impact strength and toughness of the system.
5. The filler, in combination with the glass, should not exhibit significant tendency to react chemically with the workpiece under the grinding conditions chosen, in order to minimize wheel pickup and loading.
6. The filler should improve the thermal conductivity of the grinding system to prevent overheating of the abrasive and the workpiece, thus reducing wheel wear and metallurgical damage to the material being ground.

Grinding wheels prepared according to the teachings of this invention may have compositions in which the constituents (as defined herein) and void content will be present in quantities (expressed as volume per cent) in the ranges shown below:

| | |
|---|---|
| Abrasive grit | 6–30% |
| Borosilicate glass | 20–50% |
| Metal filler | 10–25% |
| Voids | 10–30% |

The amount of binder employed to provide green strength determines the void content of the completed wheel. The binder material should be a depolymerizable polymer that is converted to monomers without leaving carbon residue. Carbon in contact with the borosilicate glass during firing will reduce the glass and destroy its properties. Polymethylmethacrylate and polyisobutylmethacrylate are suitable binder materials. Other useful binder materials may be selected by reference to Section II (pages 389–95) of the Polymer Handbook [Edited by J. Brandrup et al, Interscience, 1966].

What we claim as new and desire to secure by Letters Patent of the United States is:

1. A vitreous-bonded abrasive article system comprising in combination cubic boron nitride grains, a borosilicate glass and metal powder filler, the metal being selected from the group consisting of molybdenum and alloys thereof.

2. The vitreous-bonded abrasive article recited in claim 1 wherein the abrasive system consists of the following materials (expressed in volume per cent):

| | |
|---|---|
| cubic boron nitride | 6–30% |
| Lead oxide borosilicate glass | 20–50% |
| metal filler | 10–25% |
| voids | 10–30% |

3. The vitreous-bonded abrasive article recited in claim 1 wherein the metal filler is molybdenum.

* * * * *